(12) United States Patent
Kramer

(10) Patent No.: US 7,857,194 B2
(45) Date of Patent: Dec. 28, 2010

(54) METHOD OF JOINING METALS TO CERAMIC MATRIX COMPOSITES

(75) Inventor: Daniel P. Kramer, Centerville, OH (US)

(73) Assignee: University of Dayton, Dayton, OH (US)

( * ) Notice: Subject to any disclaimer, the term of this patent is extended or adjusted under 35 U.S.C. 154(b) by 258 days.

(21) Appl. No.: 12/113,296

(22) Filed: May 1, 2008

(65) Prior Publication Data

US 2008/0274362 A1 Nov. 6, 2008

Related U.S. Application Data

(60) Provisional application No. 60/915,289, filed on May 1, 2007.

(51) Int. Cl.
*B23K 31/02* (2006.01)
(52) U.S. Cl. .................. 228/122.1; 228/245; 228/248.1
(58) Field of Classification Search ........................ None
See application file for complete search history.

(56) References Cited

U.S. PATENT DOCUMENTS

| | | | | |
|---|---|---|---|---|
| 2,857,663 A | * | 10/1958 | Beggs ..................... | 228/122.1 |
| 3,091,028 A | * | 5/1963 | Westbrook et al. ........ | 228/124.5 |
| 3,515,574 A | * | 6/1970 | Montgomery ............ | 427/383.3 |
| 3,549,337 A | * | 12/1970 | Palmer ..................... | 428/557 |
| 3,736,650 A | * | 6/1973 | Anderson ................. | 228/122.1 |
| 4,117,968 A | * | 10/1978 | Naidich et al. ............ | 228/124.1 |
| 4,123,293 A | * | 10/1978 | Okikawa et al. .......... | 228/123.1 |
| 4,598,025 A | * | 7/1986 | Mizuhara .................. | 428/450 |
| 4,624,403 A | * | 11/1986 | Kohno et al. ............. | 228/124.1 |
| 4,624,404 A | * | 11/1986 | Ohmae et al. ............ | 228/198 |
| 4,686,080 A | * | 8/1987 | Hara et al. ................ | 419/8 |
| 4,703,884 A | * | 11/1987 | Landingham et al. ..... | 228/124.5 |
| 4,763,828 A | * | 8/1988 | Fukaya et al. ............ | 228/124.1 |
| 4,784,313 A | * | 11/1988 | Godziemba-Maliszewski ... | 228/194 |
| 4,942,999 A | * | 7/1990 | Oda et al. ................. | 228/124.7 |
| 5,043,229 A | * | 8/1991 | Mizuhara .................. | 428/613 |
| 5,104,029 A | * | 4/1992 | Claar ....................... | 228/124.5 |
| 5,108,025 A | * | 4/1992 | Kang et al. ............... | 228/124.7 |
| 5,125,557 A | * | 6/1992 | Tanaka et al. ............. | 228/121 |
| 5,160,090 A | * | 11/1992 | Friedrich et al. .......... | 228/121 |

(Continued)

FOREIGN PATENT DOCUMENTS

EP 0361678 A1 * 4/1990

OTHER PUBLICATIONS

Li et al., Joining of SiC ceramic to Ni-based superalloy with functionally gradient material fillers and a tungsten intermediate layer, Journal of Materials Science, 2003, pp. 4064-4070, vol. 38.

*Primary Examiner*—Kiley Stoner
(74) *Attorney, Agent, or Firm*—Dinsmore & Shohl LLP

(57) ABSTRACT

A method of joining metals to a ceramic material such as a ceramic matrix composite is provided which utilizes a compliant interlayer having a coefficient of thermal expansion between the coefficient of thermal expansion of the metal and that of the ceramic matrix composite. The compliant interlayer is bonded to the metal, and the ceramic matrix composite is then bonded to the bonded interlayer/metal. The method results in a high strength joint between a metal having a high coefficient of thermal expansion and a ceramic material having a low coefficient of thermal expansion.

6 Claims, 3 Drawing Sheets

U.S. PATENT DOCUMENTS

| | | | |
|---|---|---|---|
| 5,161,728 A * | 11/1992 | Li | 228/124.1 |
| 5,251,803 A * | 10/1993 | Kashiba et al. | 228/124.5 |
| 5,400,947 A * | 3/1995 | Wang et al. | 228/124.5 |
| 5,495,978 A * | 3/1996 | Muth | 228/122.1 |
| 5,794,838 A * | 8/1998 | Ushikoshi et al. | 228/121 |
| 6,021,939 A * | 2/2000 | Shim et al. | 228/122.1 |
| 6,221,511 B1 * | 4/2001 | Sakuraba et al. | 428/621 |
| 6,280,584 B1 * | 8/2001 | Kumar et al. | 204/298.15 |
| 6,328,198 B1 * | 12/2001 | Ohashi et al. | 228/194 |
| 6,521,350 B2 * | 2/2003 | Fey et al. | 428/472 |
| 6,613,450 B2 * | 9/2003 | Tsukaguchi et al. | 428/621 |
| 6,758,386 B2 | 7/2004 | Marshall et al. | |
| 6,989,200 B2 * | 1/2006 | Byers et al. | 428/621 |
| 7,261,753 B2 * | 8/2007 | Yamamoto et al. | 51/309 |
| 2002/0125300 A1 * | 9/2002 | Ishikawa et al. | 228/122.1 |
| 2002/0148880 A1 * | 10/2002 | Brink | 228/194 |
| 2003/0052154 A1 * | 3/2003 | Marshall et al. | 228/122.1 |
| 2004/0060968 A1 * | 4/2004 | Takahashi et al. | 228/122.1 |
| 2004/0126612 A1 * | 7/2004 | Shinkai et al. | 428/627 |
| 2005/0098609 A1 * | 5/2005 | Greenhut et al. | 228/122.1 |
| 2005/0194425 A1 * | 9/2005 | Schnittgrund | 228/122.1 |
| 2006/0000874 A1 * | 1/2006 | Jiang et al. | 228/122.1 |
| 2008/0131723 A1 * | 6/2008 | Tucker et al. | 428/623 |
| 2008/0131724 A1 * | 6/2008 | Chu et al. | 428/627 |

* cited by examiner

METHOD OF JOINING METALS TO CERAMIC MATRIX COMPOSITES

CROSS-REFERENCE TO RELATED APPLICATIONS

This application claims the benefit of U.S. Provisional Application No. 60/915,289, filed May 1, 2007, entitled METHOD OF JOINING METALS TO CERAMIC MATRIX COMPOSITES AND OTHER CERAMIC MATERIALS. The entire contents of said application are hereby incorporated by reference.

STATEMENT REGARDING FEDERALLY SPONSORED RESEARCH OR DEVELOPMENT

This invention was made with government support under Contract No. CCRP 2005-03 awarded by the Ohio Aerospace Institute. The government has certain rights in the invention.

BACKGROUND OF THE INVENTION

The present invention is directed to a method of joining metals to ceramic matrix composites, and more particularly, to a method which provides a high strength bond between a metal such as a superalloy and a ceramic matrix composite or other ceramic material.

Ceramic matrix composites and other ceramic materials are contemplated for use in a number of industries as they provide high operating temperatures and desirable physical and mechanical properties. An example of such a ceramic matrix composite is a SiC/SiC composite. In recent years, there has been a need for even higher operating temperature components. For example, jet engine manufacturers have a need for increasing the operating temperatures of various internal components for the purpose of increasing engine performance.

In order to withstand higher temperature environments, it would be desirable to be able to join, bond, or otherwise connect a ceramic matrix composite to a metal structural member. However, in most instances, the desired metal structural member is a superalloy that has a very high coefficient of thermal expansion (CTE) while the ceramic matrix composite has a relatively low coefficient of thermal expansion. For example, a commercially available superalloy such as Inconel 718® has a CTE of about $14.5 \times 10^{-6}$ cm/cm/° C. from room temperature to about 600° C., while a SiC/SiC composite has a CTE of about $4 \times 10^{-6}$ cm/cm/° C. from room temperature to about 600° C. Accordingly, it has been difficult to reliably connect these two classes of materials, which has limited their commercial application.

Accordingly, there is still a need in the art for a method of bonding metal to a ceramic matrix composite or other ceramic material.

SUMMARY OF THE INVENTION

Embodiments of the present invention meet those needs by providing a method for joining metals such as superalloys to ceramic materials such as ceramic matrix composites. The method provides a high strength bond between high thermal expansion superalloys and low thermal expansion ceramic matrix composites by the use of an interlayer which facilitates bonding of the metal to the ceramic matrix composite. The method may also be used to provide a high strength bond between a low thermal expansion metal and a higher thermal expansion ceramic material. The resulting joined composite is able to withstand higher operating temperature environments than with the use of metal alone.

According to one aspect of the present invention, a method of joining a metal to a ceramic material is provided comprising providing a metal and a ceramic material; providing a compliant interlayer having a coefficient of thermal expansion which is between the coefficient of thermal expansion of the metal and the coefficient of thermal expansion of the ceramic material; bonding the compliant interlayer to the metal; and bonding the ceramic material to the bonded interlayer/metal.

In one embodiment, the compliant interlayer has a coefficient of thermal expansion of about $7 \times 10^{-6}$ cm/cm/° C. from room temperature to about 600° C. In another embodiment, the compliant interlayer has a coefficient of thermal expansion of about $11.35 \times 10^{-6}$ cm/cm/° C. from room temperature to about 600° C.

The metal used in the method may be selected from iron-nickel based superalloys, cobalt-based superalloys, iron-based steel, and stainless steel.

The interlayer may be selected from an iron-nickel-chromium alloy, iron-nickel alloy, or stainless steel.

In one embodiment, the ceramic material comprises a ceramic matrix composite selected from silicon carbide/silicon carbide (SiC/SiC), ceramic oxide, ceramic carbide, and/or ceramic nitride, or combinations thereof.

In another embodiment, the ceramic material is selected from alumina, aluminum nitride, boron carbide/nitride, silicon carbide/nitride.

The compliant interlayer may be bonded to the metal layer by welding, metallizing, brazing, or diffusion bonding. After bonding the metal and compliant interlayer, the ceramic material may be bonded to the bonded interlayer/metal by brazing. The brazing process may include placing a braze alloy in contact with the interlayer surface of the bonded interlayer/metal, placing the ceramic material over the braze alloy, and then heating the structure.

The resulting joined metal/ceramic composite exhibits a high operating temperature.

Accordingly, it is a feature of the present invention to provide a method of joining a metal to a ceramic material such as a ceramic matrix composite. These, and other features and advantages of the present invention, will become apparent from the following detailed description, the accompanying drawings, and the appended claims.

DETAILED DESCRIPTION OF PREFERRED EMBODIMENTS

Figure 1:
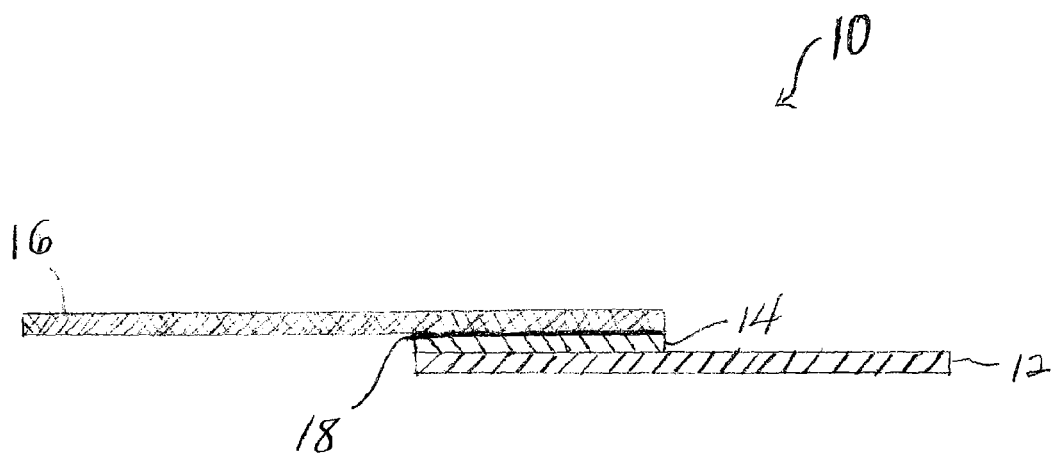
FIG. 1 is a view illustrating a ceramic matrix composite joined to a metal with an interlayer in accordance with the present invention.

Embodiments of the method of the present invention provide a significant improvement in that the resulting joined metal/ceramic composite has an increased operating temperature and may be used in a variety of applications. For example, the joined metal/ceramic composite may exhibit an operating temperature which is slightly below the solidus temperature of the selected braze material used in the bonding method. The joined composite material may be used in aerospace, automotive, medical, and any other applications in which there is a need to bond two materials which may have a large differential in coefficient of thermal expansion.

Suitable superalloys for use in the method of the present invention include commercially available superalloys such as Inconel 718® (commercially available from Special Metals Corporation, Huntington, W. Va.) which is a nickel-chromium based superalloy. However, other superalloys such as iron-nickel based, cobalt-based, or other superalloys may also be used. Other metals which may be used in the method include iron-based steel, stainless steel, and any other metal to which an interlayer can be bonded.

The ceramic matrix composite may comprise, for example, a silicon carbide/silicon carbide (SiC/SiC) composite. Other suitable ceramic matrix composites include ceramic oxide, ceramic carbide, and/or ceramic nitride, or combinations of these ceramic-based matrix composites. Other ceramic materials that may be used in the method include alumina, aluminum nitride, boron carbide/nitride, silicon carbide/nitride, and the like.

The compliant interlayer may comprise an iron-nickel-chromium alloy such as Kovar, commercially available from Eagle Alloys Corporation. Kovar has a CTE of about $7 \times 10^{-6}$ cm/cm/° C. (from room temperature to about 600° C.). Another suitable interlayer is Invar 36, commercially available from Eagle Alloys Corporation, which has a CTE of about $11.35 \times 10^{-6}$ cm/cm/° C. (from room temperature to about 600° C.).

Other suitable interlayer materials include iron-nickel alloys, and stainless steels having a low coefficient of thermal expansion such as chromium ferritic or 400 series stainless steels. Any metal may be used as the interlayer as long as it possesses a coefficient of thermal expansion which is between the coefficient of thermal expansion of the two materials being joined. For example, a superalloy having a coefficient of thermal expansion of about $14.5 \times 10^{-6}$ cm/cm ° C. may be bonded to a ceramic matrix composite having a coefficient of thermal expansion of $4 \times 10^{-6}$ cm/cm ° C. using an interlayer having a coefficient of thermal expansion of $7 \times 10^{-6}$ cm/cm° C. By selecting an interlayer having a CTE between that of the materials being joined, bonding is greatly enhanced.

The interlayer may be bonded to the metal, for example, by metallizing, brazing, welding (such as laser welding) or diffusion bonding.

The ceramic matrix composite is then bonded to the resulting joined interlayer/metal, for example, by brazing or soldering. In this method, a braze alloy may be placed in contact with the interlayer, and the ceramic matrix composite is then placed over the braze alloy. The braze alloy may be selected from commercially available materials including incuro, nioro, ticuni, cusil, nicusil, and the like. The ceramic matrix composite/braze alloy/bonded metal-interlayer is then heated to a temperature of about 1000° C. to complete the brazing process. Heating may also take place using a vacuum furnace, oven, heat lamp or other heating apparatus. The application of epoxies or other self-curing or drying materials may also be used in place of heating.

Other suitable materials used for bonding the ceramic matrix composite to the interlayer/metal include glass, glass-ceramic materials, or any other material which is capable of forming a joint between the interlayer and the ceramic matrix composite.

In one embodiment of the method, a thin sheet of Kovar is bonded to an Inconel 718® piecepart by laser welding. An incuro braze material is then placed on top of the welded Kovar. An SiC/SiC composite is then placed on top of the braze material. The assembly is then placed in a vacuum furnace and heated to about 1000° C. for about 10 minutes.

Referring now to FIG. 1, a joined metal/ceramic composite 10 is shown. As shown, the metal layer 12 has been bonded to an interlayer 14, and the bonded metal/interlayer has been bonded to a ceramic matrix composite 16 with a braze material 18.

While the invention has been described primarily with regard to the bonding of superalloys to ceramic matrix composites, it should be appreciated that the method may be applied to the bonding of metal to metal, metal to ceramic, metal to glass, metal to composites, and other combinations of these materials.

In order that the invention may be more readily understood, reference is made to the following examples which are intended to illustrate the invention, but not limit the scope thereof.

EXAMPLE 1

A machined bar of Inconel 718 and a 0.007 inch thick piece of Kovar (interlayer) were laser welded together to achieve a fully welded interlayer/metal structure. By "fully" welded, it is meant that multiple laser weld beads were used, in this instance, about 30. The quality of the welds was good.

Figure 2:
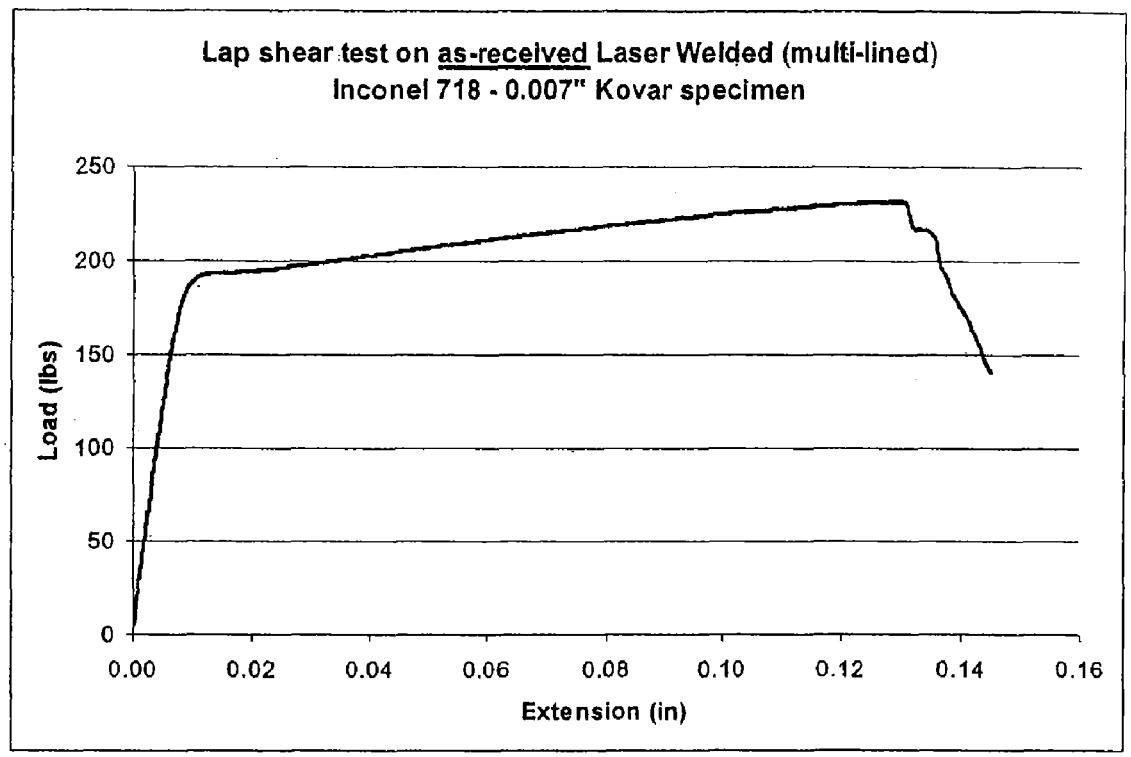
FIG. 2 is a graph illustrating tensile lap shear results for a welded superalloy/interlayer welded specimen.

In addition, 4-line welded Inconel 718/Kovar test specimens were also fabricated. Tensile lap shear mechanical tests were performed on laser welded Inconel 718/0.007" thick Kovar specimens. The results obtained on 4-line laser welded specimens are shown in FIG. 2. The results are positive in that the tensile lap shear specimens failed only via the actual yielding of the Kovar strip material without any indication of failure in the laser weld itself. Overall, the data demonstrates that the Kovar yielded before the failure of the welds, demonstrating that the welds are inherently stronger than the Kovar.

EXAMPLE 2

Figure 3:
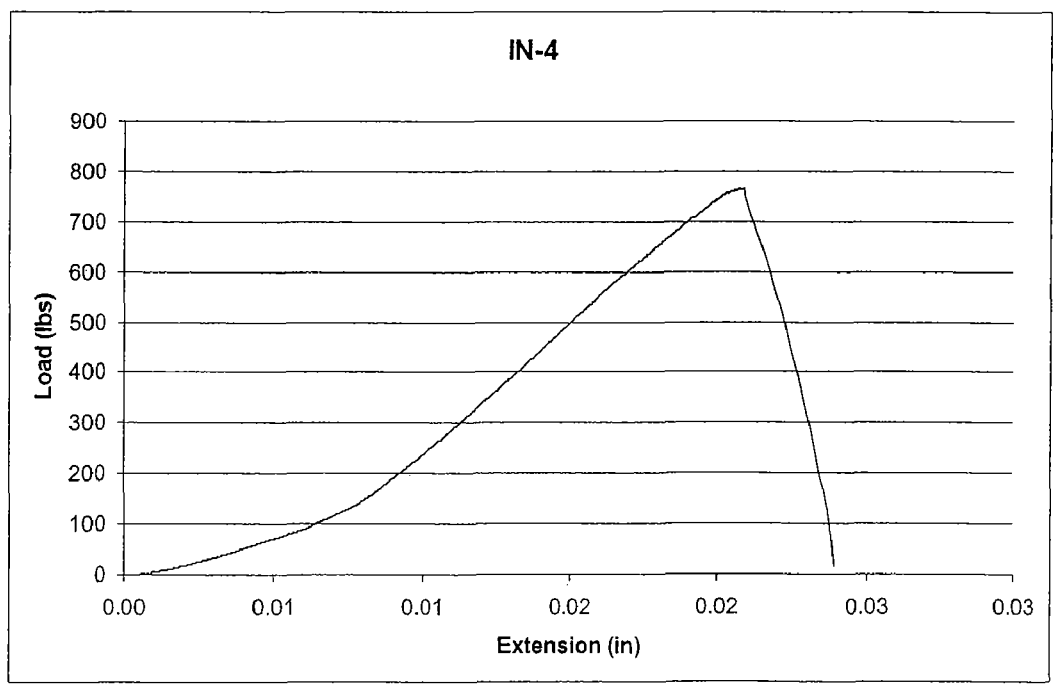
FIG. 3 is a graph illustrating the results of a lap shear test on superalloy/interlayer/SiC—SiC bonded composite specimens.

A SiC/SiC composite was joined to a laser welded Inconel 718/Kovar subassembly using various braze materials including Incuro, Nioro, Nioro ABA, and Ticuni (manufactured by Morgan Advanced Ceramics/Wesgo, Hayward, Calif.). Several of the resulting joined components were tensile lap shear tested. The tensile lap shear test results shown in FIG. 3 were based on test specimen IN-4 which comprised an Inconel 718-laser welded Kovar/Incuro braze/SiC—SiC composite. The results showed that the resulting bond was very strong as it failed only after the application of about 750 pounds of load which corresponds to a bond strength of about 4250 psi.

These results demonstrate that the method of the present invention provides high strength joints between a superalloy having a high coefficient of thermal expansion (such as Inconel 718) and ceramic-based SiC—SiC composites having a low coefficient of thermal expansion.

Having described the invention in detail and by reference to preferred embodiments thereof, it will be apparent that modifications and variations are possible without departing from the scope of the invention.

What is claimed is:

1. A method of joining a metal to a ceramic material comprising:
   providing a metal and a ceramic material comprising a ceramic matrix composite selected from silicon carbide/silicon carbide (SiC/SiC), ceramic oxide, ceramic carbide, ceramic nitride, or combinations thereof, or a ceramic material selected from alumina, aluminum nitride, boron carbide/nitride, and silicon carbon/nitride;

providing a compliant interlayer having a coefficient of thermal expansion which is between the coefficient of thermal expansion of the metal and the coefficient of thermal expansion of the ceramic material;

welding said compliant interlayer directly to said metal to form a bonded interlayer/metal; and bonding said ceramic material to said bonded interlayer/metal with a brazing material.

2. The method of claim 1 wherein said compliant interlayer has a coefficient of thermal expansion of about $7 \times 10^{-6}$ cm/cm/° C. from room temperature to about 600° C.

3. The method of claim 1 wherein said compliant interlayer has a coefficient of thermal expansion of about $11.35 \times 10^{-6}$ cm/cm/° C. from room temperature to about 600° C.

4. The method of claim 1 wherein said metal is selected from iron-nickel based superalloys, cobalt-based superalloys, iron-based steel, and stainless steel.

5. The method of claim 1 wherein said interlayer is selected from an iron-nickel-chromium alloy, an iron-nickel alloy, and stainless steel.

6. The method of claim 1 including placing a braze alloy in contact with said interlayer/metal and placing said ceramic material over said braze alloy.

* * * * *